(12) United States Patent
Solodky et al.

(10) Patent No.: US 11,385,328 B2
(45) Date of Patent: Jul. 12, 2022

(54) SEQUENTIAL TARGET PARAMETER ESTIMATION FOR IMAGING RADAR

(71) Applicant: GM GLOBAL TECHNOLOGY OPERATIONS LLC, Detroit, MI (US)

(72) Inventors: Gaston Solodky, Herzliya (IL); Oren Longman, Tel Aviv (IL); Shahar Villeval, Tel Aviv (IL); Igai Bilik, Rehovot (IL)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 179 days.

(21) Appl. No.: 16/103,173

(22) Filed: Aug. 14, 2018

(65) Prior Publication Data

US 2020/0057137 A1  Feb. 20, 2020

(51) Int. Cl.
   *G01S 7/40*   (2006.01)
   *G01S 7/35*   (2006.01)
   *G01S 13/931* (2020.01)

(52) U.S. Cl.
   CPC .............. *G01S 7/40* (2013.01); *G01S 7/354* (2013.01); *G01S 13/931* (2013.01); *G01S 7/356* (2021.05)

(58) Field of Classification Search
   CPC .......... G01S 7/40; G01S 7/354; G01S 13/931; G01S 2007/356
   USPC ........................................................ 342/81
   See application file for complete search history.

(56) References Cited

U.S. PATENT DOCUMENTS

| | | | | |
|---|---|---|---|---|
| 5,731,779 A | * | 3/1998 | Kikuchi | G01S 13/931 342/174 |
| 7,106,421 B2 | * | 9/2006 | Matsuura | G01S 7/4972 356/3.01 |
| 8,421,631 B2 | * | 4/2013 | Bloy | H01Q 3/36 455/562.1 |
| 8,836,573 B2 | * | 9/2014 | Yanagihara | G01S 7/414 342/179 |
| 2007/0001897 A1 | * | 1/2007 | Alland | G01S 7/352 342/158 |
| 2011/0267219 A1 | * | 11/2011 | Kisliansky | G01S 13/56 342/159 |
| 2011/0298652 A1 | * | 12/2011 | Yanagihara | G01S 13/874 342/146 |
| 2011/0304498 A1 | * | 12/2011 | Yanagihara | G01S 7/412 342/179 |
| 2013/0027240 A1 | * | 1/2013 | Chowdhury | G01S 13/345 342/175 |
| 2016/0048129 A1 | * | 2/2016 | Kolanek | G05D 1/0022 701/2 |
| 2017/0300047 A1 | * | 10/2017 | Kolanek | F42B 15/01 |
| 2017/0356994 A1 | * | 12/2017 | Wodrich | G01S 15/87 |

(Continued)

FOREIGN PATENT DOCUMENTS

GB      2495408 A  *  4/2013  ........... G01S 13/003

*Primary Examiner* — Bernarr E Gregory
*Assistant Examiner* — Nuzhat Pervin
(74) *Attorney, Agent, or Firm* — Cantor Colburn LLP (57) ABSTRACT

A vehicle, radar system for the vehicle and method for detecting an object. The radar system includes a transmitter for transmitting a source signal and a receiver for receiving a reflection of the source signal from an object. A processor obtains a radar parameter of the object from the received reflection, adjusts an operating parameter of the radar based on the radar parameter to provide an altered source signal, and detects the object based on a reflection of the altered source signal.

17 Claims, 4 Drawing Sheets

(56) References Cited

U.S. PATENT DOCUMENTS

| | | | |
|---|---|---|---|
| 2018/0081029 A1* | 3/2018 | Davis | G01S 13/70 |
| 2018/0233047 A1* | 8/2018 | Mandeville-Clarke | B62D 15/0255 |
| 2018/0273030 A1* | 9/2018 | Weldon | B60W 30/09 |
| 2019/0033441 A1* | 1/2019 | Gonzáles Valdés | G01S 19/43 |
| 2019/0039548 A1* | 2/2019 | Muthukumar | B60R 21/13 |
| 2019/0346548 A1* | 11/2019 | Barkan | G01S 13/5242 |

* cited by examiner

SEQUENTIAL TARGET PARAMETER ESTIMATION FOR IMAGING RADAR

INTRODUCTION

The subject disclosure relates to vehicular radar systems and, in particular, to a method of operating a radar system to improve performance on target detection, resolution and detection range.

An autonomous or semi-autonomous vehicle uses a radar system to navigate and guide the vehicle with respect to a target or object. The radar system utilizes its resources in order to provide uniform detection across range, Doppler and direction of arrival parameters. The uniform utilization of its resources however does not allow the radar system to measure any of these parameters over a specific range or with a specific resolution. Accordingly, it is desirable to provide a method for improving detection range and resolution on known targets.

SUMMARY

In one exemplary embodiment, a method for detecting an object is disclosed. The method includes obtaining a radar parameter of the object, adjusting an operating parameter of the radar based on the radar parameter, and detecting the object using the radar having the adjusted operating parameter.

In addition to one or more of the features described herein, adjusting the operating parameter further includes adjusting at least one of a waveform setting parameters of the radar and a processing parameter of a processor of the radar. Adjusting the waveform setting parameter further includes adjusting at least one of a beam steering setting of a transmitter of the radar, a range resolution setting of the transmitter of the radar, and a Doppler resolution setting of the transmitter of the radar. Adjusting the waveform setting parameter further comprises adjusting at least one of a range around target setting of a receiver of the radar, a range focusing setting of the receiver of the radar. Adjusting the processing parameter further comprises adjusting at least one of a range filter at a range FFT stage, a Doppler filter at a Doppler FFT stage, and a beamforming filter at a beamforming stage. Adjusting the operating parameter of the radar further includes adjusting the operating parameter to select or focus at a location of the object. The method further includes navigating a vehicle with respect to the object based on detecting the object using the adjusted operating parameter.

In another exemplary embodiment, a radar system for a vehicle is disclosed. The radar system includes a transmitter configured to transmit a source signal, a receiver configured to receive a reflection of the source signal from an object, and a processor. The processor is configured to obtain a radar parameter of the object from the received reflection, adjust an operating parameter of the radar based on the radar parameter to provide an altered source signal, and detect the object based on a reflection of the altered source signal.

In addition to one or more of the features described herein, the processor is further configured to adjust the operating parameter by adjusting at least one of a waveform setting parameter of the radar and a processing parameter of a processor of the radar. The waveform setting parameter includes at least one of a beam steering setting of the transmitter, a range resolution setting of the transmitter, and a Doppler resolution setting of the transmitter. The waveform setting parameter includes at least one of a range around target setting of a receiver of the radar, and a range focusing setting of the receiver of the radar. The processor is further configured to adjust the processing parameter by adjusting at least one of a range filter at a range FFT stage, a Doppler filter at a Doppler FFT stage, and a beamforming filter at a beamforming stage. The processor is further configured to adjust the operating parameter to select or focus at a location of the object. The processor is further configured to navigate the vehicle with respect to the object based on detecting the object using the adjusted operating parameter.

In yet another exemplary embodiment, a vehicle is disclosed. The vehicle includes a transmitter configured to transmit a source signal, a receiver configured to receive a reflection of the source signal from an object, and a processor. The processor is configured to obtain a radar parameter of the object from the received reflection, adjust an operating parameter of the radar based on the radar parameter to provide an altered source signal, and detect the object based on a reflection of the altered source signal.

In addition to one or more of the features described herein, the processor is further configured to adjust the operating parameter by adjusting at least one of a waveform setting parameters of the radar, and a processing parameter of a processor of the radar. The waveform setting parameter includes at least one of a beam steering setting of the transmitter, a range resolution setting of the transmitter, and a Doppler resolution setting of the transmitter. The waveform setting parameter includes at least one of a range around target setting of a receiver of the radar, and a range focusing setting of the receiver of the radar. The processor is further configured to adjust the processing parameter by adjusting at least one of a range filter at a range FFT stage, a Doppler filter at a Doppler FFT stage, and a beamforming filter at a beamforming stage. The processor is further configured to adjust the operating parameter to select or focus at a location of the object.

The above features and advantages, and other features and advantages of the disclosure are readily apparent from the following detailed description when taken in connection with the accompanying drawings.

BRIEF DESCRIPTION OF THE DRAWINGS

Other features, advantages and details appear, by way of example only, in the following detailed description, the detailed description referring to the drawings in which.

DETAILED DESCRIPTION

The following description is merely exemplary in nature and is not intended to limit the present disclosure, its application or uses. It should be understood that throughout the drawings, corresponding reference numerals indicate like or corresponding parts and features.

Figure 1:
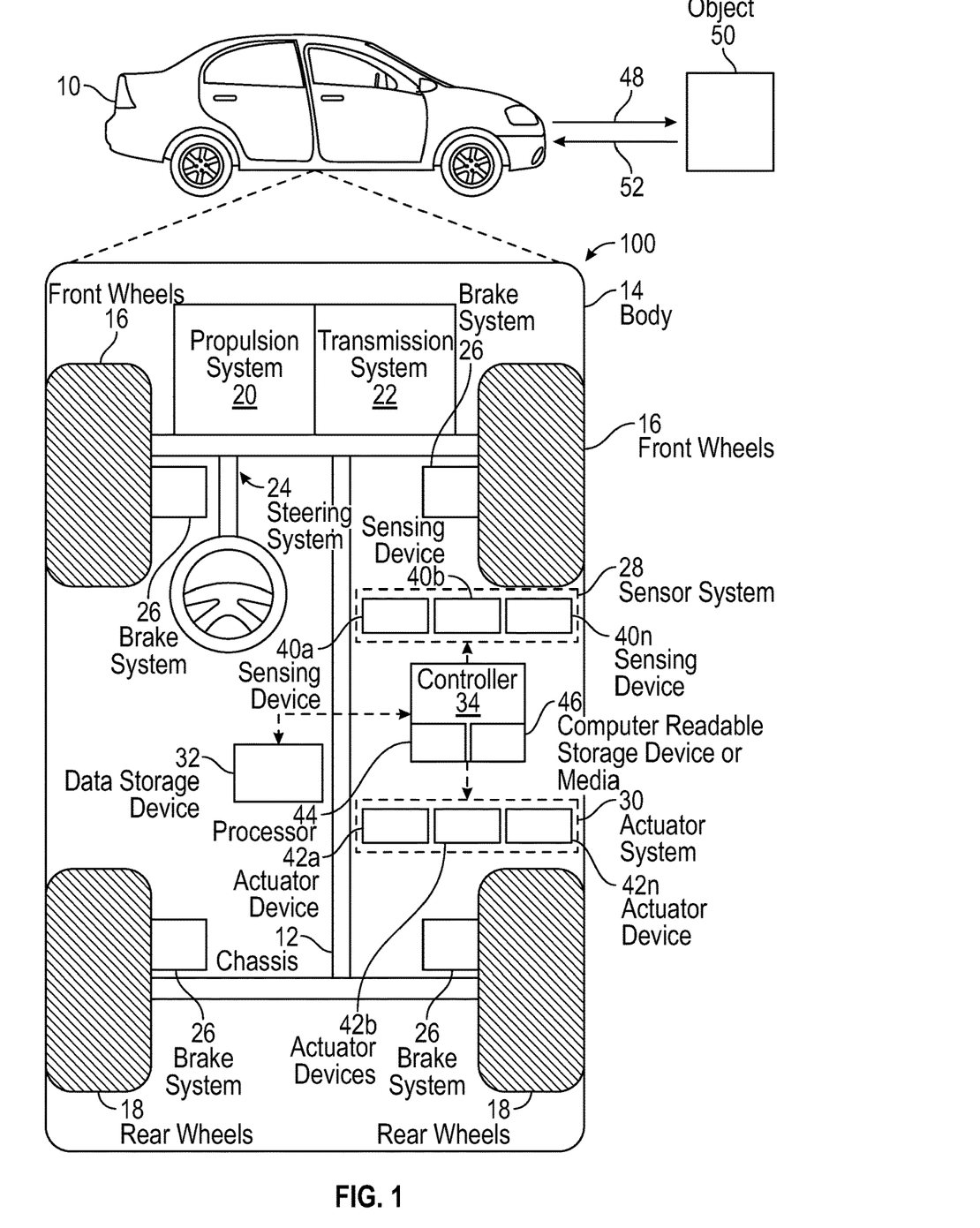
FIG. 1 shows a vehicle with an associated trajectory planning system in accordance with various embodiments.

In accordance with an exemplary embodiment, FIG. 1 shows a vehicle 10 with an associated trajectory planning system depicted at 100 in accordance with various embodiments. In general, the trajectory planning system 100 determines a trajectory plan for automated driving of the vehicle 10. The vehicle 10 generally includes a chassis 12, a body 14, front wheels 16, and rear wheels 18. The body 14 is arranged on the chassis 12 and substantially encloses components of the vehicle 10. The body 14 and the chassis 12 may jointly form a frame. The wheels 16 and 18 are each rotationally coupled to the chassis 12 near respective corners of the body 14.

In various embodiments, the vehicle 10 is an autonomous vehicle and the trajectory planning system 100 is incorporated into the autonomous vehicle 10 (hereinafter referred to as the autonomous vehicle 10). The autonomous vehicle 10 is, for example, a vehicle that is automatically controlled to carry passengers from one location to another. The autonomous vehicle 10 is depicted in the illustrated embodiment as a passenger car, but it should be appreciated that any other vehicle including motorcycles, trucks, sport utility vehicles (SUVs), recreational vehicles (RVs), marine vessels, aircraft, etc., can also be used. In an exemplary embodiment, the autonomous vehicle 10 is a so-called Level Four or Level Five automation system. A Level Four system indicates "high automation", referring to the driving mode-specific performance by an automated driving system of all aspects of the dynamic driving task, even if a human driver does not respond appropriately to a request to intervene. A Level Five system indicates "full automation", referring to the full-time performance by an automated driving system of all aspects of the dynamic driving task under all roadway and environmental conditions that can be managed by a human driver.

As shown, the autonomous vehicle 10 generally includes a propulsion system 20, a transmission system 22, a steering system 24, a brake system 26, a sensor system 28, an actuator system 30, at least one data storage device 32, and at least one controller 34. The propulsion system 20 may, in various embodiments, include an internal combustion engine, an electric machine such as a traction motor, and/or a fuel cell propulsion system. The transmission system 22 is configured to transmit power from the propulsion system 20 to the vehicle wheels 16 and 18 according to selectable speed ratios. According to various embodiments, the transmission system 22 may include a step-ratio automatic transmission, a continuously-variable transmission, or other appropriate transmission. The brake system 26 is configured to provide braking torque to the vehicle wheels 16 and 18. The brake system 26 may, in various embodiments, include friction brakes, brake by wire, a regenerative braking system such as an electric machine, and/or other appropriate braking systems. The steering system 24 influences a position of the vehicle wheels 16 and 18. While depicted as including a steering wheel for illustrative purposes, in some embodiments contemplated within the scope of the present disclosure, the steering system 24 may not include a steering wheel.

The sensor system 28 includes one or more sensing devices 40a-40n that sense observable conditions of the exterior environment and/or the interior environment of the autonomous vehicle 10. The sensing devices 40a-40n can include, but are not limited to, radars, lidars, global positioning systems, optical cameras, thermal cameras, ultrasonic sensors, and/or other sensors. In various embodiments, the vehicle 10 includes a radar system including an array of radar sensors, the radar sensors of the radar array being located at various locations along the vehicle 10. In operation, a radar sensor sends out an electromagnetic source pulse 48 that is reflected back at the vehicle 10 by one or more objects 50 in the field of view of the sensor. The source pulse 48 is a linear frequency modulated (LFM) pulse or "chirp" pulse suitable for determining range, Doppler and direction of arrival measurements of the one or more objects 50. The radar system further includes circuitry for controlling operational parameters of the radar system in order to increase resolution for a selected extent or region of the radar coverage or to increase the probability of detection and decrease the probability of false alarm (Pd/Pfa) within the region.

The actuator system 30 includes one or more actuator devices 42a-42n that control one or more vehicle features such as, but not limited to, the propulsion system 20, the transmission system 22, the steering system 24, and the brake system 26. In various embodiments, the vehicle features can further include interior and/or exterior vehicle features such as, but are not limited to, doors, a trunk, and cabin features such as ventilation, music, lighting, etc. (not numbered).

The controller 34 includes at least one processor 44 and a computer readable storage device or media 46. The processor 44 can be any custom made or commercially available processor, a central processing unit (CPU), a graphics processing unit (GPU), an auxiliary processor among several processors associated with the controller 34, a semiconductor based microprocessor (in the form of a microchip or chip set), a macroprocessor, any combination thereof, or generally any device for executing instructions. The computer readable storage device or media 46 may include volatile and nonvolatile storage in read-only memory (ROM), random-access memory (RAM), and keep-alive memory (KAM), for example. KAM is a persistent or non-volatile memory that may be used to store various operating variables while the processor 44 is powered down. The computer-readable storage device or media 46 may be implemented using any of a number of known memory devices such as PROMs (programmable read-only memory), EPROMs (electrically PROM), EEPROMs (electrically erasable PROM), flash memory, or any other electric, magnetic, optical, or combination memory devices capable of storing data, some of which represent executable instructions, used by the controller 34 in controlling the autonomous vehicle 10.

The instructions may include one or more separate programs, each of which includes an ordered listing of executable instructions for implementing logical functions. The instructions, when executed by the processor 44, receive and process signals from the sensor system 28, perform logic, calculations, methods and/or algorithms for automatically controlling the components of the autonomous vehicle 10, and generate control signals to the actuator system 30 to automatically control the components of the autonomous vehicle 10 based on the logic, calculations, methods, and/or algorithms. Although only one controller 34 is shown in FIG. 1, embodiments of the autonomous vehicle 10 can include any number of controllers 34 that communicate over any suitable communication medium or a combination of communication mediums and that cooperate to process the sensor signals, perform logic, calculations, methods, and/or algorithms, and generate control signals to automatically control features of the autonomous vehicle 10.

The trajectory planning system 100 navigates the autonomous vehicle 10 based on a determination of objects and/their locations within the environment of the vehicle. In various embodiments the controller 34 operates a plurality of radars at various locations on the vehicle 10 to determine a parameter (i.e., range, elevation and azimuth, Doppler frequency) of the object 50 using a plurality of chirp signals and controls a size of a detection region for the parameter as well as resolution. Upon determining various parameters of the object, the controller 34 can operate the one or more actuator devices 42a-n, the propulsion system 20, transmission system 22, steering system 24 and/or brake 26 in order to navigate the vehicle 10 with respect to the object 50.

Figure 2:
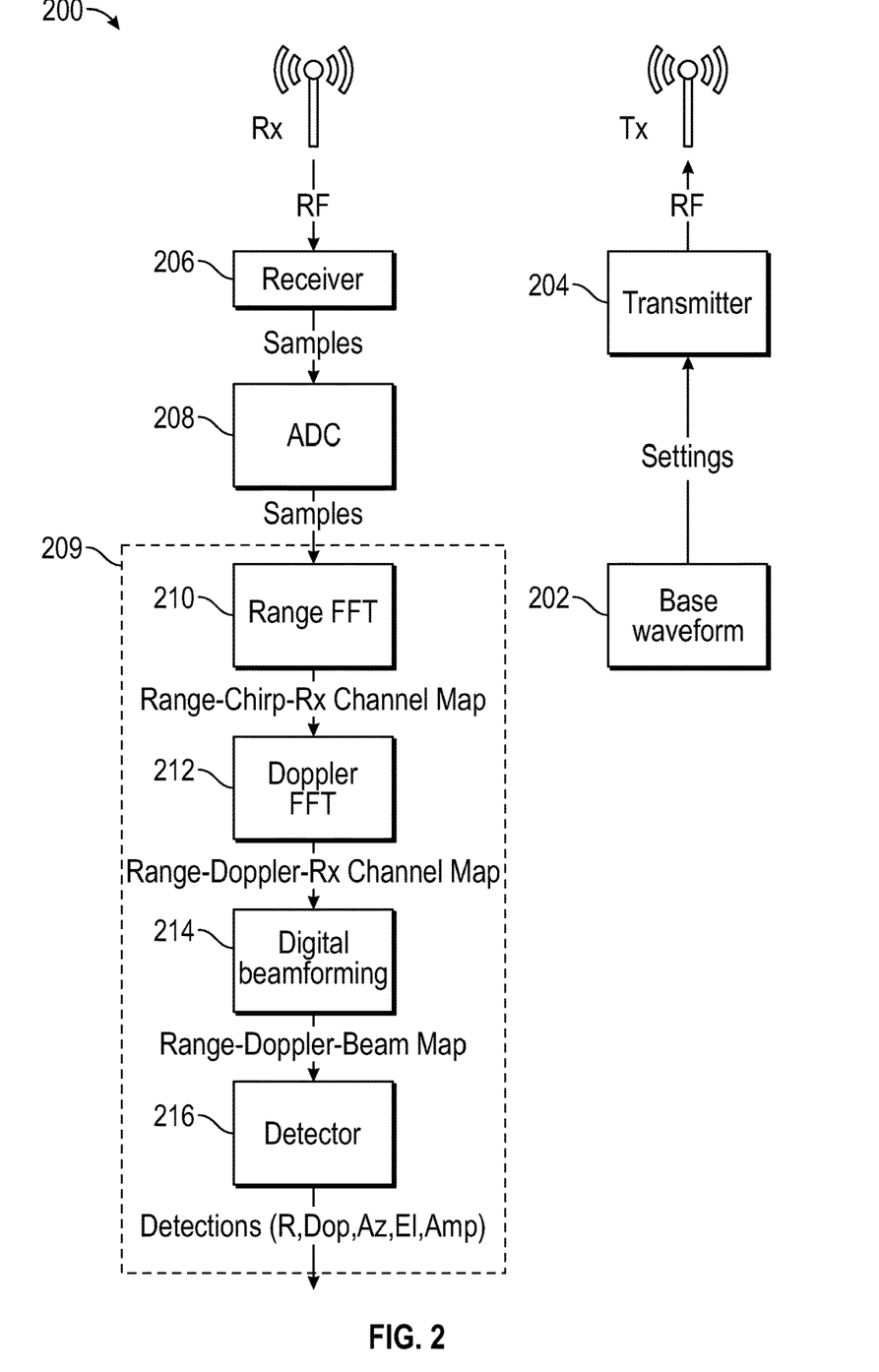
FIG. 2 schematically depicts components for operation of a radar system.

FIG. 2 schematically depicts components for operation of a radar system 200. A waveform generator 202 generates a base waveform and provides the base waveform to a transmitter 204. The transmitter 204 includes circuitry for generating an electromagnetic source signal from the base waveform and provides the source signal to transmitter antenna (Tx) which propagates the source signal into the environment. A reflection 52 of the source signal is received at receiver antenna (Rx) and produces an electrical signal at receiver 206. The received signal is sampled and converted to a digital signal at an analog-to-digital converter (ADC) 208. The sampled signal is then provided to a digital processor 209 that detects targets while extracting their range, Doppler, and direction of arrival. The targets detection is done on the Range-Doppler-Beam map which is generated by three processing blocks. First, range FFT 210 is performed along every chirp to extract the range information and obtain Range-Chirp-Rx channel map. The Doppler FFT 212 is performed along the chirp axis to extract the Doppler information and obtain Range-Doppler-Rx channel map, and lastly Digital Beamforming 214 is perform along the Rx channel axis to extract the direction of arrival information and obtain the Range-Doppler-Beam map. The results after Digital Beamforming 214 are provided to a detector 216 that detects targets and estimates the range, Doppler, azimuth, elevations (direction of arrival) and amplitude values for each target.

The radar system 200 of FIG. 2 distributes its resources uniformly over the parameter ranges. Various methods, as discussed with respect to FIG. 4, can be implemented into the radar system 200 in order to select a parameter for finer observation. This can mean reducing an observation area around a selected range, radial velocity or direction of arrival. In various embodiments, the selected range, radial velocity or direction of arrival can be determined or selected based on a value of the parameter previously obtained by the radar system.

Range resolution of a linear-frequency modulation (LFM) signal is determined by the signal bandwidth (BW). In particular, range resolution $\Delta R$ is given by:

$$\Delta R = c/2BW \quad \text{Eq. (1)}$$

where c is the speed of light and the bandwidth (BW) is the product of the slope (k) of the chirp signal and the duration of the transmission of the chirp signal, as expressed below in Eq. (2):

$$BW = k\tau \quad \text{Eq. (2)}$$

The range resolution can be improved by increasing the signal slope (k). Increasing the signal slope reduces the maximum detection range. The detection range however can be fixed around a target area.

Doppler Resolution is inversely proportional to the time-on-target (TTOT) as expressed in Eq. (3):

$$\Delta f_c = 1/T_{TOT} \quad \text{Eq. (3)}$$

Doppler resolution can therefore be increased by increasing the time on target. The time on target is related to the radar scan rate (FPS) by:

$$FPS = 1/T_{TOT} \quad \text{Eq. (4)}$$

Figure 3:
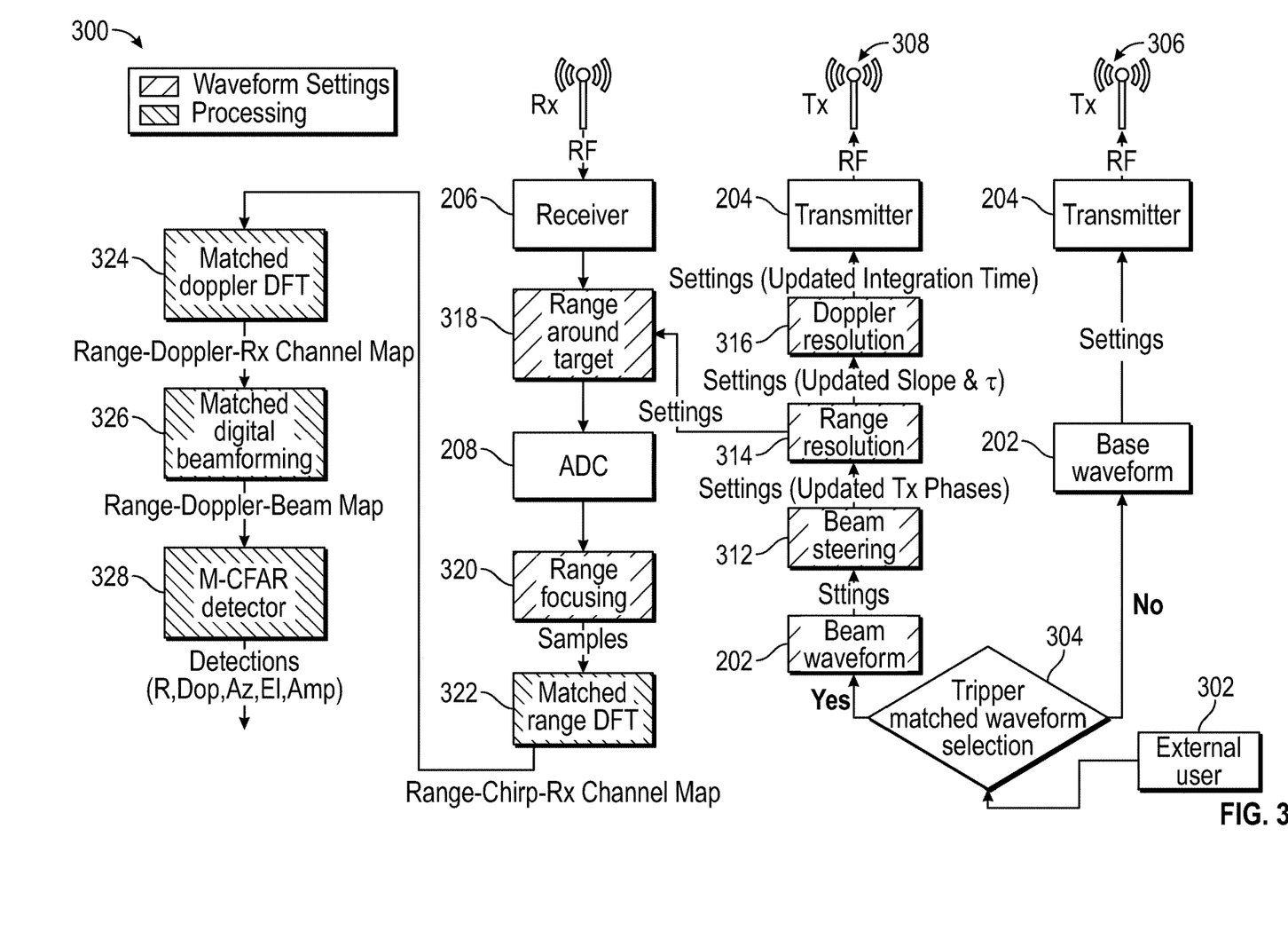
FIG. 3 schematically depicts a radar system including components for operating a radar system according to an embodiment of the invention.

FIG. 3 schematically depicts a radar system 300 including components for operating according to an embodiment. Components 312, 314, 316, 318 and 320 are components suitable for adjusting waveform settings. Components 322, 324, 326 and 328 are processing stages suitable for data manipulation within a processor.

An external user 302 can select a mode of operation of the radar system 300 to operate the radar system 300 according to a processing mode discussed with respect to FIG. 2 or in a matched transmit processing mode for beam generation. A decision box 304 selects a path of the flowchart based on an input by the external user 302. If matched waveform selection 304 is not selected, operation of the radar system 300 proceeds along branch 306 in which the waveform generator 202 generates a base waveform and provides waveform to a transmitter 204, which generates a source signal from the waveform for propagation into the environment. If the matched waveform selection 304 is selected, then operation of the radar system 300 proceeds along branch 308 in which waveform settings can be adjusted. In various embodiments the waveform setting can be adjusted in response to a reflection signal. The branch 308 includes various components for varying the waveform. The base waveform is provided in box 202. The beam steering controller 312 controls a direction of orientation of the source signal by, for example, changing the phase between the antennas of the radar array. The range resolution controller 314 controls the range resolution of the source signal by, for example, adjusting the slope of the chirp signal. The Doppler resolution controller 316 controls a Doppler resolution by adjusting the time on target of the source signal. The adjustments made by the beam steering controller 312, range resolution controller 314 and Doppler resolution controller 316 are made to have an optimal performance for a detected target.

The waveform resulting from the adjustments by at least one of the beam steering controller 312, range resolution controller 314 and Doppler resolution controller 316 is provided to the transmitter 204 that propagates the source signal into the environment by transmitter antenna Tx. The changes made to the range resolution are also provided to a component 318 in the receiver circuitry.

The reflected signal is received at a receiver 206 via a receiver antenna Rx. The range around target component 318 alters the detection range of the receiver to be centered around a selected range. In various embodiments, this can be performed due to maximum instrumental range decrease from the slope change in range resolution component 314. The Analog-to-Digital Converter 208 samples and converts the reflection signal to a digital signal.

The range focusing component 320 adjusts a range of the received signal to account for target movement over a frame duration of the source signal. A target with high radial velocity migrates between range bins during the frame, reducing a signal-to-noise ratio for the target. The range focusing component 320 mitigates the effects of high radial velocity motion by correcting the range using a known target radial velocity.

The processor then performs a matched range transform 322, a matched Doppler transform 324 and a matched digital beamforming 326. The matched range DFT (Discrete Fourier Transform) 322 includes an additional filter applied for the measured range of the detected target. Similarly, the matched Doppler transform 324 includes an additional filter that is centered around the measured Doppler frequency of the detected target. The matched digital beamforming 326 also includes an additional filter centered around the measured direction of arrival of the detected target. A detector component 328 then determines range, Doppler, azimuth, elevations and amplitude values for the object. These additional filters reduce scalloping loss inherent in the FFT process and beamforming process, thus increasing the detection range of the radar.

Figure 4:
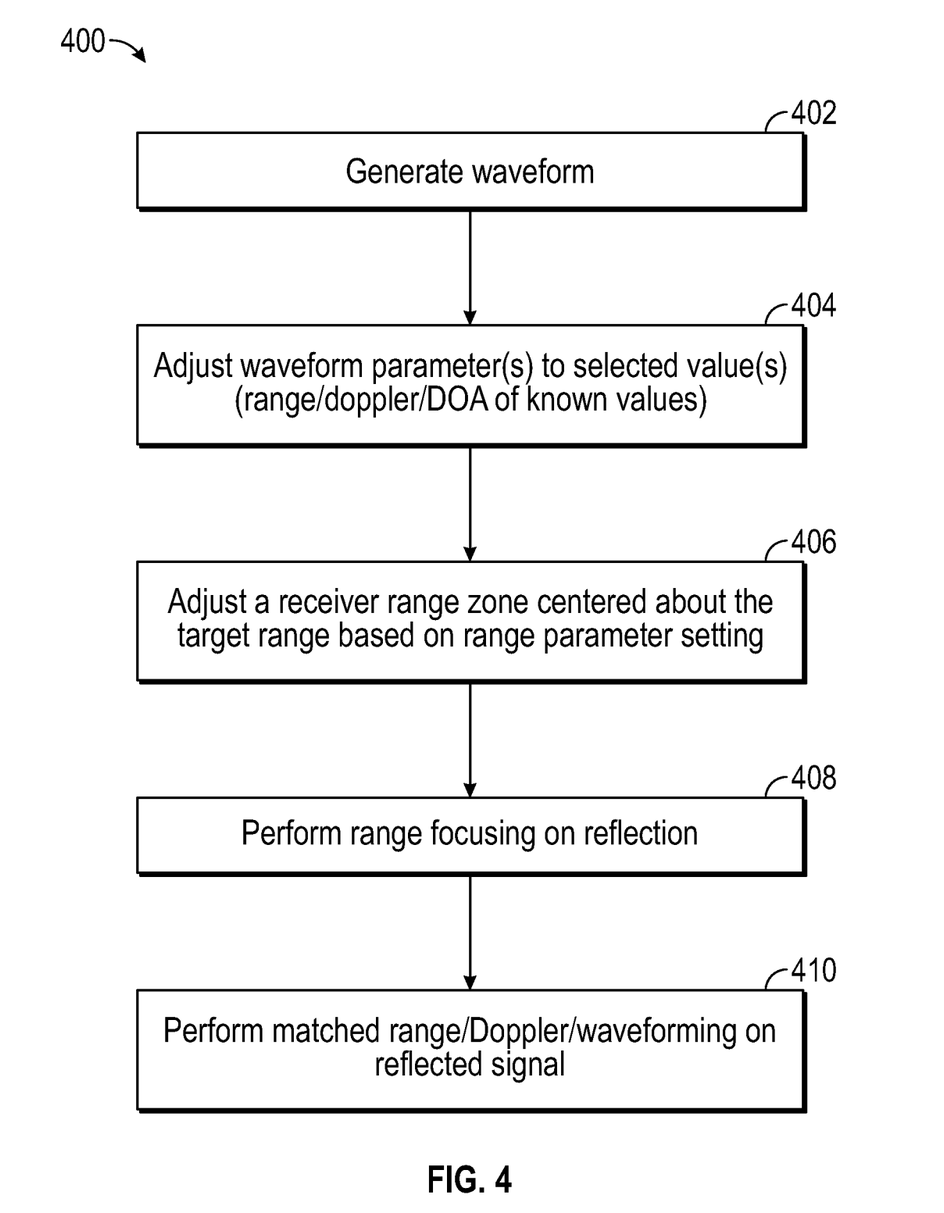
FIG. 4 shows a flowchart illustrating a method for target parameter estimation using the methods disclosed herein.

FIG. 4 shows a flowchart illustrating a method 400 for target parameter estimation using the methods disclosed herein. In box 402, a waveform for source signal is generated. In box 404, parameters of the waveform are adjusted. In various embodiments, the parameters are adjusted in order to focus at a previously-measured location of the target. This previously measured location can be determined from range/Doppler/DOA measurements previously obtained by the radar system.

In box 406, a reflection of the sources signal is received, with a range zone of the receiver adjusted to the range setting of the source signal. In box 408, range focusing is performed on the received reflection. In box 410, matched processing is performed on the reflection signal to obtain a parameter with increased resolution over a selected region and improved signal-to-noise ratio (SNR).

While the above disclosure has been described with reference to exemplary embodiments, it will be understood by those skilled in the art that various changes may be made and equivalents may be substituted for elements thereof without departing from its scope. In addition, many modifications may be made to adapt a particular situation or material to the teachings of the disclosure without departing from the essential scope thereof. Therefore, it is intended that the present disclosure not be limited to the particular embodiments disclosed, but will include all embodiments falling within the scope thereof.

What is claimed is:

1. A method for detecting an object, comprising:
   receiving a reflection of a source signal from the object at a receiver of a radar system;
   obtaining a first detection of a location of the object and a first detection of velocity based on the reflection of the source signal;
   adjusting a waveform setting parameter of the radar system to reduce an observation area of the radar system around an estimated location of the object based on the first detection of location;
   transmitting an altered source signal from the radar system using the adjusted waveform setting parameter;
   reducing a detection range of the receiver around the estimated location of the object using the first detection of the location;
   correcting a range zone of a received signal for an estimated velocity of the object using the first detection of velocity;
   adjusting a processing parameter to the corrected range zone; and
   processing the received signal to obtain a second detection of the location of the object using the adjusted processing parameter.

2. The method of claim 1, wherein adjusting the waveform setting parameter further comprising adjusting at least one of: (i) a beam steering setting of a transmitter of the radar system; (ii) a range resolution setting of the transmitter of the radar system; and (iii) a Doppler resolution setting of the transmitter of the radar system.

3. The method of claim 1, wherein adjusting the waveform setting parameter further comprising adjusting at least one of: (i) a range around target setting of a receiver of the radar system; (ii) a range focusing setting of the receiver of the radar system.

4. The method of claim 1, wherein adjusting the processing parameter further comprising adjusting at least one of: (i) a range filter at a range FFT stage; (ii) a Doppler filter at a Doppler FFT stage; and (iii) a beamforming filter at a beamforming stage.

5. The method of claim 1, further comprising adjusting the waveform setting parameter to select or focus at the estimated location of the object.

6. The method of claim 1, further comprising navigating a vehicle with respect to the object based on the second detection of the location of the object.

7. A radar system for a vehicle, comprising:
   a transmitter configured to transmit a source signal;
   a receiver configured to receive a reflection of the source signal from an object; and
   a processor configured to:
   obtain a first detection of a location of the object and a first detection of velocity of the object from the received reflection;
   adjust a waveform setting parameter of the radar system to reduce an observation area of the radar system around an estimated location of the object based on the first detection of location;
   transmit an altered source signal from the radar system using the adjusted waveform setting parameter;
   reduce a detection range of the receiver around the estimated location of the object using the first detection of the location;
   correct a range zone of a received signal for an estimated velocity of the object using the first detection of velocity;
   adjust a processing parameter to the corrected range zone; and
   process the received signal to obtain a second detection of the location of the object using the adjusted processing parameter.

8. The radar system of claim 7, wherein the waveform setting parameter comprises at least one of: (i) a beam steering setting of the transmitter; (ii) a range resolution setting of the transmitter; and (iii) a Doppler resolution setting of the transmitter.

9. The radar system of claim 7, wherein the waveform setting parameter comprises at least one of: (i) a range around target setting of a receiver of the radar; and (ii) a range focusing setting of the receiver of the radar.

10. The radar system of claim 7, wherein the processing parameter comprises at least one of: (i) a range filter at a range FFT stage; (ii) a Doppler filter at a Doppler FFT stage; and (iii) a beamforming filter at a beamforming stage.

11. The radar system of claim 7, wherein the processor is further configured to adjust the waveform setting parameter to select or focus at the estimated location of the object.

12. The radar system of claim 7, wherein the processor is further configured to navigate the vehicle with respect to the object based on the second detection of the location of the object.

13. A vehicle, comprising:
   a transmitter configured to transmit a source signal;
   a receiver configured to receive a reflection of the source signal from an object; and
   a processor configured to:
   obtain a first detection of a location of the object and a first detection of velocity of the object from the received reflection;

adjust a waveform setting parameter of the radar to reduce an observation area of the radar system around and estimated location of the object based on the first detection of location;

transmit an altered source signal from the radar system using the adjusted waveform setting parameter;

reduce a detection range of the receiver around the estimated location of the object using the first detection of the location;

correct a range zone of a received signal for an estimated velocity of the object using the first detection of velocity;

adjust a processing parameter to the corrected range zone; and process the received signal to obtain a second detection of the location of the object using the adjusted processing parameter.

14. The vehicle of claim 13, wherein the waveform setting parameter comprises at least one of: (i) a beam steering setting of the transmitter; (ii) a range resolution setting of the transmitter; and (iii) a Doppler resolution setting of the transmitter.

15. The vehicle of claim 13, wherein the waveform setting parameter comprises at least one of: (i) a range around target setting of a receiver of the radar; and (ii) a range focusing setting of the receiver of the radar.

16. The vehicle of claim 13, wherein the processing parameter comprises at least one of: (i) a range filter at a range FFT stage; (ii) a Doppler filter at a Doppler FFT stage; and (iii) a beamforming filter at a beamforming stage.

17. The vehicle of claim 13, wherein the processor is further configured to adjust the waveform setting parameter to select or focus at the first detection of the location of the object.

* * * * *